Dec. 21, 1926.
C. E. DUNN
1,611,423
IGNITION DEVICE
Filed April 12, 1924
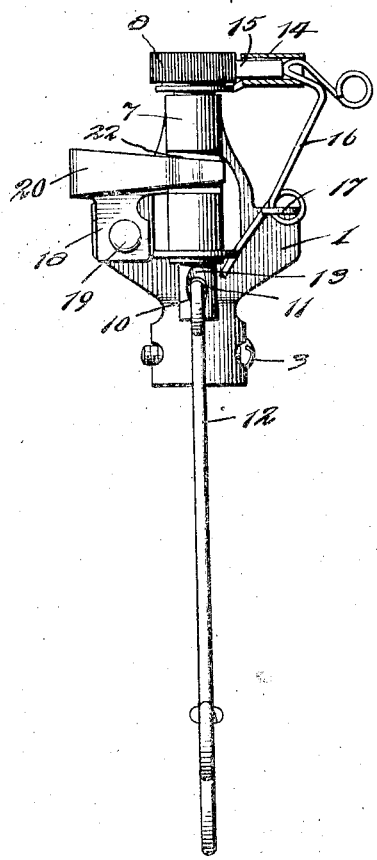
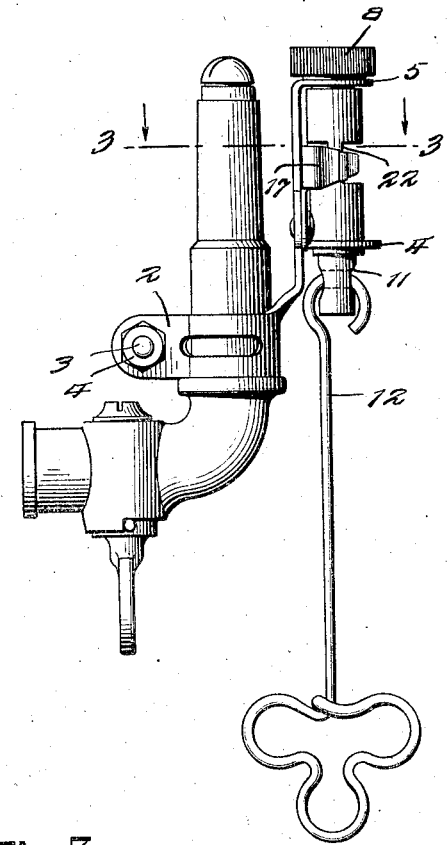
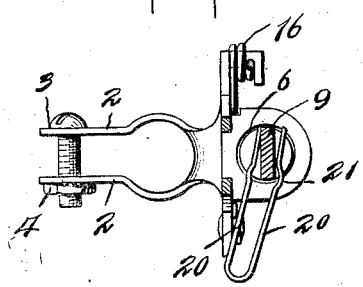
Inventor
Clifford E. Dunn
By his Attorneys
Dunn Goodlett & Massie Patented Dec. 21, 1926.

1,611,423

UNITED STATES PATENT OFFICE.

CLIFFORD E. DUNN, OF SHORT HILLS, NEW JERSEY.

IGNITION DEVICE.

Application filed April 12, 1924. Serial No. 705,999.

My invention relates to certain new and useful improvements in ignition devices and especially to gas-lighters of the friction type, particularly adapted for use in connection with the usual form of gas burners. It has for its object the production of a new, improved and simplified construction, and one which will also be positive and economical in operation and, at the same time, not likely to get out of order even under misuse.

Other objects and desirable features will be apparent from an examination of the drawings and a reading of the following description, and it will be understood that the invention in its broadest aspects is not to be limited to the specific form shown and described.

As stated, one typical embodiment of my invention is illustrated in the accompanying drawings wherein—

Fig. 1 is a front view, partly in section for the sake of clearness;

Fig. 2 is a side elevation of the structure of Fig. 1, showing the same applied to a standard form of gas jet; and Fig. 3 is a sectional view taken on the line 3—3 of Fig. 2 looking in the direction of the arrows.

In devices of this character the ignition means usually employed comprises a piece of pyrophoric metal so arranged as to be abraded or frictionally acted upon by a friction member. In devices of this kind it is necessary that the movement of the frictional member shall be rapid enough to cause the projection of sparks, and that these sparks be projected in the direction of the gas flow to be ignited.

In the structure shown, the frame is indicated by the numeral 1, which preferably consists of a single stamping formed of suitable sheet metal such as brass, projections 2—2 from the lower end thereof being bent as shown to form engaging members for clamping to the gas burner or tip. A bolt 3 and nut 4 serve to draw the members together and secure them firmly in place around the burner. From this frame or base plate 1, projecting bearing flanges 4, 5 are struck, being bent at right angles and perforated as shown, for instance, at 6. In the apertures of these flanges is journalled the rotating member 7 which consists of a cylindrical shaft reduced in diameter at the upper end sufficiently to pass through the perforation in flange 5, and adapted to have secured to the reduced end projecting above the flange, a rotating friction member 8, which preferably consists of a hardened steel wheel having file-like teeth provided upon its periphery. This friction member is firmly secured by means of a screw or rivet connection to the upper reduced end of the member 7, and rotates therewith. The member 7 is also provided preferably near its middle portion with recesses upon two sides, the remaining portion of the member forming a flat blade or leaf element 9 having opposite flat faces or cam surfaces 22 for engagement with the operating spring hereinafter to be described.

The lower end 10 of the member 7 is also reduced and provided with perforation or aperture 11, into which the operating handle 12 is adapted for engagement and the outer edges of this aperture are flared as at 13.

A cylindrical member 14 is also provided for containing the pyrophoric material 15 and a spring 16, bent in suitable manner as shown, engages a projection 17 on the frame, and, bearing against the rear of the pyrophoric material, forces it constantly toward and into frictional engagement with the rotating friction member 8, as will be readily understood from an inspection of Fig. 1.

The operating means for giving rapid rotation to the friction member 7 consists of a spring having an L-shaped projection 18, secured by means of a rivet 19 to a portion of the main frame 1, and this spring is provided at its upper end with a pair of substantially parallel operating members 20—20 preferably provided with a kink or ripple 21, the two members when in place lying adjacent to and upon opposite sides of the flat blade 9 of the rotating member 7.

The operation of the device will be readily understood. When clamped in position upon a gas burner, as shown in Fig. 1, the operating handle 12 hangs downward as illustrated. Spring 16 holds the forward face of the pyrophoric material 15 against the friction member 8. Upon grasping the handle and turning the same to the right, the handle first moves independently a short distance due to the loose fit of the upper or hooked-end thereof, in the eyelet or aperture 11. The continued turning of the handle, however, causes it to engage and rotate the member 7 and with it the friction member 8 affixed thereto thereby overcoming its frictional engagement with the pyrophoric material 15, and at the same time, the parallel members 21 of the spring 17 are displaced by engagement with the blade 9 of the member 7. Upon continuing the rotating of the handle and the members 7 to a point where the blade 9 passes slightly beyond a position in which it is at right angles to the spring arms 21, the said arms bearing on the blade assist instead of impeding its rotation, causing it to snap over, the loose connection between the eyelet of the handle permitting a limited rotation independent of the handle. This quick snap or rotation of the member 7 and friction member 8 causes the production of a very fat spark from the pyrophoric material, and this spark will travel directly in to the path of the flow of the gas stream from the burner.

It will thus be seen that my device provides a most efficient and satisfactory burner, while utilizing a minimum of material and but very few parts, and at the same time it is rigid and positive in operation. Furthermore, it is a proof against injury by a careless user, for even if an unskilled person manipulates the handle, for instance, turning it in the wrong direction, no injury to the device will be produced or its efficiency in any way impaired.

Having thus described one form of my invention what I claim and desire by Letters Patent is:

1. In an ignition device, the combination of a pyrophoric element, a friction wheel, a shaft carrying the wheel, manual means for imparting a limited rotational movement to the shaft, means for thereupon further rotating the shaft and accelerating its rotation through an angle such that the total movement of the shaft will be one-half a revolution on each operation, such accelerating means including a blade-like longitudinal subdivision of the shaft and a leaf spring arranged to be engaged by an end-edge of said subdivision and thrown out of its normal plane during the limited rotational movement of the shaft, and means for permitting the shaft, during its accelerated rotation, to move ahead of the manual means.

2. In an ignition device, the combination of a pyrophoric element, a friction wheel, a shaft carrying said wheel, manual means involving lost motion for imparting a limited rotational movement to the shaft, and a single integral means operating upon the said shaft and adapted to first resist and later accelerate the rotation of said shaft, so disposed that the total movement of the shaft will be one-half of a complete revolution on each operation of the manually operating means.

3. In an ignition device, the combination of a plurality of spark producing elements, one of which is a revoluble friction member, a frame on which the shaft is journaled, means for manually rotating the shaft, and means for permitting successive fractional rotations of the shaft and for accelerating such rotations through substantially quarter revolutions, said accelerating means comprising a pair of co-acting leaf elements, one rigid and carried by the shaft, and the other resilient and anchored on the frame.

4. In an ignition device, the combination of a plurality of spark producing elements, one of which is a revoluble friction member, a frame on which the shaft is journaled, means for manually rotating the shaft, and means for permitting successive fractional rotations of the shaft and for accelerating each of such fractional rotations, said accelerating means comprising a plurality of leaf elements, one rigid and carried by the shaft, and two resilient and anchored upon the support, both the anchored elements being anchored on the same side of the shaft and normally extending substantially parallel to and on opposite sides of the rigid element, whereby on rotating the shaft manually both resilient elements are distorted by the opposite ends of the rigid element and in such manner that as the resilient elements are brought toward maximum distortion one of said ends moves away from the point of anchorage of its engaged resilient element, while the other of said ends correspondingly moves toward the point of anchorage of its engaged resilient element.

5. In an ignition device, the combination of a plurality of spark producing elements, one of which is a revoluble friction member, a frame on which the shaft is journaled, means for manually rotating the shaft, and means for permitting successive fractional rotations of the shaft and for accelerating each such fractional rotation, said accelerating means comprising a plurality of leaf elements two of which are resilient and normally parallel extensions of a single metal stamping, the other leaf element being a blade carried by the shaft and normally lying between and parallel with the two resilient elements, one of the resilient leaf elements being rippled at a point along its length whereby, during operation of the accelerating means, this resilient element functions to give the blade a kick-acceleration, the other resilient element being so shaped and disposed as to give the blade a push-acceleration persisting after the completion of such kick.

6. In an ignition device, the combination of a plurality of spark producing elements, one of which is a revoluble friction member, a frame on which the shaft is journaled, means for manually rotating the shaft, and means for permitting successive fractional rotations of the shaft and for accelerating each such fractional rotation, said accelerating means comprising a plurality of leaf elements, two of which are resilient and normally parallel extensions of a single metal stamping, the other leaf element being a blade carried by the shaft and normally lying between and parallel with the two resilient elements whereby during each limited manual rotation of the shaft the blade simultaneously distorts the two resilient leaf elements, one end of the blade moving away from the free end of its engaged resilient elements as the other blade moves toward the free end of its engaged resilient element, the last mentioned element being rippled to facilitate the distorting effect of the blade thereon as maximum distortion of both resilient elements is approached.

7. In an ignition device of the type having spark producing means including a friction wheel, the combination of a shaft carrying said wheel, means for manually initiating a predetermined fractional rotation of said shaft, and a single means partially carried by the shaft for completing and accelerating such rotations, for insuring an accelerated rotation through substantially 90°, and yet for obviating any increase in the diameter of the shaft adjacent to said single means, said single means including a bifurcated leaf spring fixed relative to the shaft and a pair of lateral recesses cut in the shaft on opposite sides of the shaft axis, such recesses establishing a transverse web forming an intermediate length of the shaft and one of the spring bifurcations being extended into each recess.

CLIFFORD E. DUNN.